(12) United States Patent
Cubbage et al.

(10) Patent No.: US 6,606,486 B1
(45) Date of Patent: Aug. 12, 2003

(54) WORD ENTRY METHOD FOR MOBILE ORIGINATED SHORT MESSAGES

(75) Inventors: Aaron David Cubbage, Fleet (GB); Inderpreet Singh Ahluwalia, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/363,437

(22) Filed: Jul. 29, 1999

(51) Int. Cl.⁷ .................... H04B 1/18; H04M 11/10
(52) U.S. Cl. .................. 455/186.2; 455/412; 455/466
(58) Field of Search ...................... 455/466, 186.2, 455/186.1, 550, 556, 566, 575, 412, 414, 418; 341/22, 23, 20; 379/93.18, 93.27; 345/168, 169, 171, 172, 773

(56) References Cited

U.S. PATENT DOCUMENTS

| | | | |
|---|---|---|---|
| RE32,365 E | * | 3/1987 | Sebestyn .................. 341/27 |
| 5,045,947 A | * | 9/1991 | Beery ..................... 455/186.2 |
| 5,581,593 A | * | 12/1996 | Engelke et al. ............. 455/556 |
| 5,809,425 A | * | 9/1998 | Colwell et al. ............. 455/466 |
| 5,929,774 A | * | 7/1999 | Charlton .................... 455/556 |
| 5,953,541 A | * | 9/1999 | King et al. ................... 710/67 |
| 6,049,697 A | * | 4/2000 | Scozzarella et al. ..... 455/186.2 |

* cited by examiner

*Primary Examiner*—Vivian Chin
*Assistant Examiner*—Eliseo Ramos-Feliciano
(74) *Attorney, Agent, or Firm*—Coats & Bennett, P.L.L.C.

(57) ABSTRACT

A text entry method simplifies entry of the text messages in a mobile phone having a limited number of entry keys. A word list is stored in the phone's memory. The word list is divided into a plurality of groups and each group is associated with a particular group key on the keypad. The user first selects a word group by pressing the corresponding group key. The user can then scroll through the words in the group to select the desired word. The selected word may optionally then be translated into a codeword and the codeword then transmitted to a remote location. Individual characters may also be selected and translated in a similar manner in some embodiments.

17 Claims, 5 Drawing Sheets

TABLE 1 - ENHANCED CHARACTER SET

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | @ | BETTER | SP | 0 | i | P | ¿ | p | FEEL | HAVE | KIDS | MAKE | NO | SECOND | THERE | WE |
| 1 | £ | - | ! | 1 | A | Q | A | q | FILL | HE | KNOW | MAKING | NOT | SEE | THING | WEEK |
| 2 | $ | BIG | " | 2 | B | R | b | R | FIND | HELP | LAST | MANY | NOW | SEND | THINK | WELL |
| 3 | ¢ | BRING | # | 3 | C | S | c | s | FIRST | HER | LATE | ME | OLD | SHE | THIS | WNT |
| 4 | ABOUT | BUT | ¤ | 4 | D | T | d | T | FOOD | HERE | LATER | MEET | ONE | SHOPPING | TIME | WHAT |
| 5 | AFTER | BUY | % | 5 | E | U | E | U | FOR | HI | LEAVE | MEETING | OUT | SOME | TODAY | WHEN |
| 6 | AFTERNOON | CALL | & | 6 | F | V | F | V | FORGET | HIM | LEFT | MINUTE | PICK | SOON | TOLD | WHERE |
| 7 | ALL | CALLED | ' | 7 | G | W | g | w | FROM | HOME | LETS | MONEY | PLAN | STAND | TOMORROW | WHO |
| 8 | AND | CAN | ( | 8 | H | X | h | x | GAVE | HOT | LIGHT | MORE | PLANE | STOP | TURN | WHY |
| 9 | ARE | CAR | ) | 9 | I | Y | i | y | GET | HOW | LITTLE | MORNING | PLEASE | STORE | UNDER | WILL |
| A | LF | CARE | * | : | J | Z | j | z | GIVE | I | LONG | MUCH | PRETTY | SURE | UNTIL | WORK |
| B | AT | COLD | + | ; | K | DID | k | DOWN | GO | I'M | LOOK | MY | PUT | TAKE | USE | WORRY |
| C | BAD | COME | , | < | L | DINNER | l | EAT | GOING | IN | LOOKING | NEED | READ | TELL | WAIT | WRITE |
| D | CR | COULD | - | = | M | DO | M | ELSE | GOOD | IT | LOVE | NEW | RIGHT | THANK | WANT | YES |
| E | BE | DAY | . | > | N | DONE | n | END | GOT | IT'S | LUNCH | NEXT | SAW | THAT | WAS | YOU |
| F | BECAUSE | DEAR | / | ? | O | DON'T | o | FAST | HAS | JUST | MADE | NIGHT | SCHOOL | THE | WAY | YOUR |

*FIG. 5*

WORD ENTRY METHOD FOR MOBILE ORIGINATED SHORT MESSAGES

FIELD OF THE INVENTION

The present invention relates generally to short messaging services for cellular phone subscribers to enable cellular subscribers to send and receive short text messages and, more particularly, to a text entry method to enable more rapid entry of text messages.

BACKGROUND OF THE INVENTION

Short Message Service (SMS) is a service implemented in many cellular systems, including GSM and ANSI/TIA/EIA-136 (ANSI-136) systems that enables cellular subscribers to send and receive short text messages. There are three basic types of messaging services—point-to-point messaging, point-to-multi-point messaging, and broadcast messaging. Point-to-point SMS sends a message from a single source to a single receiver. Point-to-multi-point SMS sends a message from a single source to two or more receivers. In both point-to-point and point-to-multi-point messaging, the receiving units are paged by the base station and notified that the message is coming. The receiving unit then tunes to a predetermined messaging channel and waits for the message. In broadcast messaging, the message is broadcast on a predetermined messaging channel to all mobile units monitoring the messaging channel.

Because mobile phones typically have very few keys, originating SMS messages from a mobile unit is a laborious task. One common approach to text entry used in cellular phones is referred to as the multi-tap method. In the multi-tap method, a plurality of alphanumeric characters and symbols are associated with the numeric keys. The numeric keys are pressed multiple times in sequence to cycle through the available characters and symbols associated with that particular key. For example, assume that the letters of the alphabet are assigned to the numeric keys as follows:

| 1-Space | 4-GHI | 7-PQRS |
|---------|-------|--------|
| 2-ABC   | 5-JKL | 8-TUV  |
| 3-DEF   | 6-MNO | 9-WXYZ |

In order to enter the word FAST with a trailing space, the user would have to press five different keys with a total of ten separate key presses. The 3-key is pressed three times to enter the letter F, the 2-key is pressed once to enter the letter A, the 7-key is pressed four times to enter the letter S, the 8-key is pressed once to enter the letter T, and the 1-key is pressed once to enter a space.

Using the multi-tap method, the user is required to spell each word, entering one character at a time. The user is required to think about the spelling of each word, key assignments (which character is associated with which key), and the number of times the key needs to be pressed in order to select the desired character. This data entry method is not intuitive and typically requires a large number of key presses. Further, the initial press of each key usually starts a timer and the cursor automatically advances when the timer expires. If the user takes too long cycling to the desired character, the wrong character will be entered. The user then has to press the CLR key and start over.

Another method commonly used for entering text messages into cellular phones is known as predictive typing, such as a method known as T9. Using a predictive typing method, the user enters the first few characters of a word using the numeric keys. For example, to enter the word FAST, the user would press the 3, 2, and 8 keys in sequence. The phone compares the key sequence entered by the user to a stored vocabulary to find matching words. If only a single matching word is found, the remainder of the characters are filled in by the phone. If more than one matching word is found, the user is allowed to scroll through a list of the matching words to select the desired word. Because the words are drawn out of a dictionary based on statistical probabilities and not on an alphabetical ordering, this method is not intuitive, especially for first-time users.

As currently implemented, the SMS service also limits the length of the text message that can be sent or received. For instance, an SMS message in GSM cannot contain more than 140 bytes of data. Since standard ASCII text requires 7 bits per character, text messages are limited to 160 characters. Of course, other systems, such as ANSI-136, may have different size limits for SMS type messages, but similar logic applies. To overcome this problem, protocols have been developed to allow longer text messages to be broken into a plurality of smaller messages, transmitted one at a time and re-assembled at the receiving end. One can refer to the teachings of the GSM and ANSI-136 specifications for exemplary SMS details; however, such details are not necessary for understanding the present invention.

The ability to send text messages is a powerful means of communication. To take full advantage of this service, the process of creating a text message needs to be as quick and efficient as possible. Therefore, there remains much room for improvement of text entry methods suitable for use by cellular subscribers to enter short text messages. Also, it would be desirable to send messages longer than 160 characters.

SUMMARY OF THE INVENTION

The present invention is a text entry method for entering short messages into a mobile phone having a limited number of keys. According to the present invention, a word list is stored in a memory. The words in the word list are divided into a plurality of word groups, with each word group being assigned to a particular key, referred to as a group key. For example, the numeric keys on the phone's keypad can be used as group keys during text entry mode. By convention, standard telephones have letters associated with the numeric keys. The letters DEF are associated with the 3-key on a standard keypad. The present invention includes a word group containing words beginning with DEF and this group is assigned to the 3-key.

To enter a word from the predefined word list into a text message, the user first selects a group key to display one of the word groups. The user can then scroll through the words in the selected word group until the desired word is reached.

In another aspect of the present invention, a plurality of alphanumeric characters and other symbols are divided into character groups. Each character group is assigned to a group key. The user can enter words or symbols that are not in the word list by selecting characters from the character groups. Characters may be selected in the same manner as words by first selecting the character group and then scrolling through the character group to the desired character or symbol.

In another aspect of the present invention, the words and characters are represented in one or more enhanced character sets, each character set including 256 words and characters. Each word or character in the character set is associated with an 8-bit codeword. Using the enhanced character set of the present invention, it is possible to send text messages having more than 160 characters, the current limit in GSM phones using the standard ASCII key character set.

Other objects and advantages will become apparent to those skilled in the art upon a review of the following specification and drawings.

BRIEF DESCRIPTION OF THE DRAWINGS

FIG. 5 is a table of one enhanced character set used by the present invention.

DETAILED DESCRIPTION OF THE INVENTION

Figure 1:
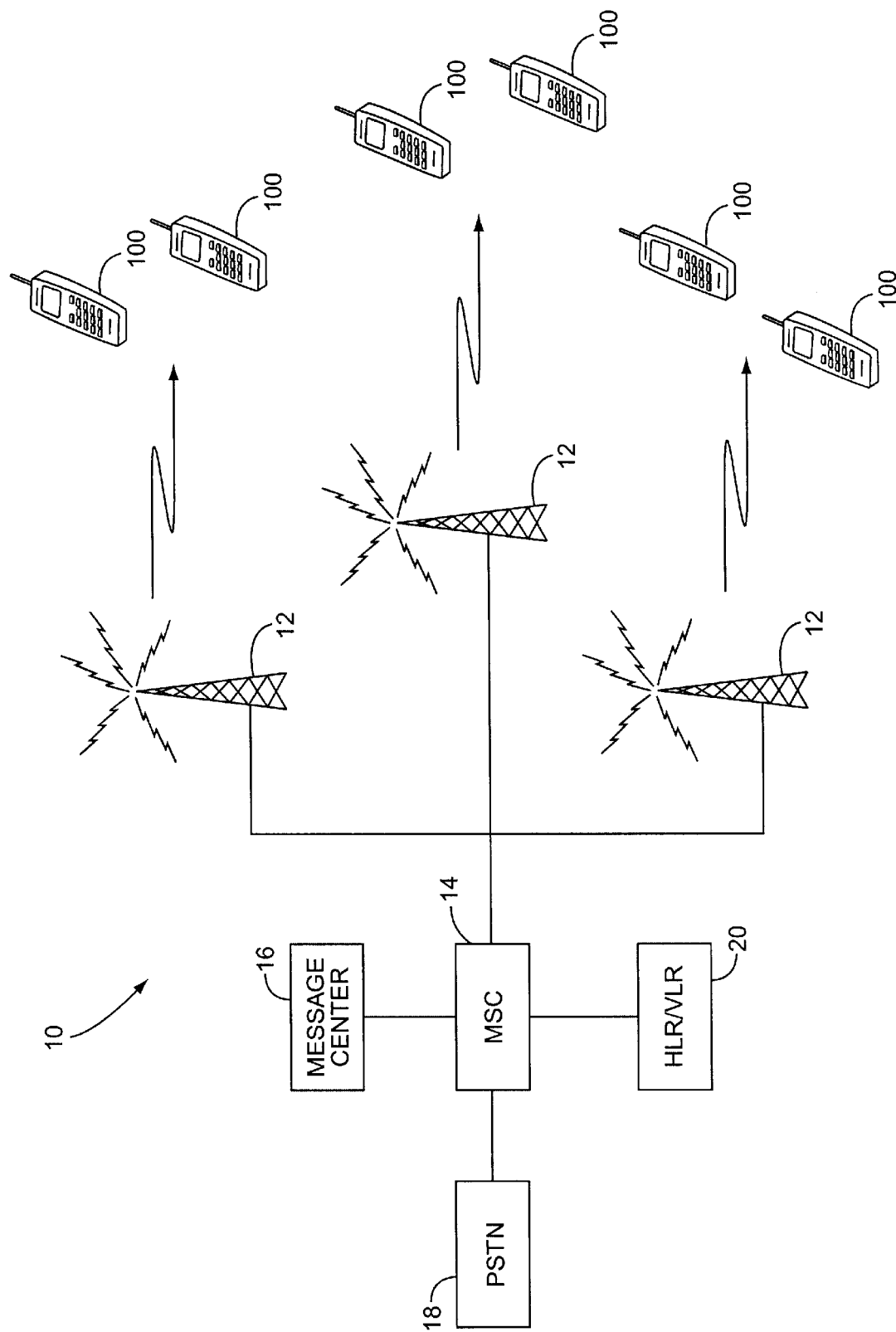
FIG. 1 is a block diagram of a cellular phone system with SMS capability.

FIG. 1 shows a schematic diagram of a cellular communication network, indicated generally by the numeral 10. The cellular communication network 10 includes a plurality of base stations 12 which are connected via a mobile services switching center (MSC) 14 to a terrestrial communications network such as the Public Switched Telephone Network (PSTN) 18. The cellular communication network will typically have a plurality of MSC's 14, each servicing a plurality of base stations 12. Each base station 12 is located in and provides service to a geographic region referred to as a cell. In general, there is one base station 12 for each cell within a given network 10.

Within each cell, there may be a plurality of mobile stations 100 that communicate via radio links with the base station 12. The base station 12 allows the user of the mobile station 100 to communicate with other mobile stations 100, or with users connected to the PSTN 18. The MSC 14 routes calls to and from the mobile station 100 through the appropriate base station 12. Information concerning the location and activity status of the mobile station 100 may be stored in a Home Location Register (HLR) and a Visitor Location Register (VLR) 20 which are maintained by the MSC 14.

A message center 16 is connected to the MSC 14 to store SMS messages originating from, or terminating at, a mobile station 100 in the domain of the MSC 14. The message center 16 is a store-and-forward device or system that is used to support teleservices like cellular messaging. The typical interfaces to the message center 16 allow directed dial-in access, computer interface for e-mail delivery to phones, or human operator input for paging services. Mobile-originated SMS messages are initially forwarded to the MSC 14 servicing the addressed mobile station 100 and routed by the MSC 14 to the message service center 16 where the SMS message is stored. The MSC 14 searches for the targeted mobile station 100 and alerts the mobile station 100 that a message is coming. The mobile station 100 tunes to a designated messaging channel (typically an SDCCH channel) where it waits for the SMS message. The MSC 14 then forwards the SMS message to the mobile station 100 on the designated channel and waits for an acknowledgement from the mobile station 100 confirming receipt of the message. If an acknowledgement is received from the mobile station 100, the message is removed from storage. If receipt of the message is not acknowledged, the MSC 14 may attempt to deliver the message again.

Figure 2:
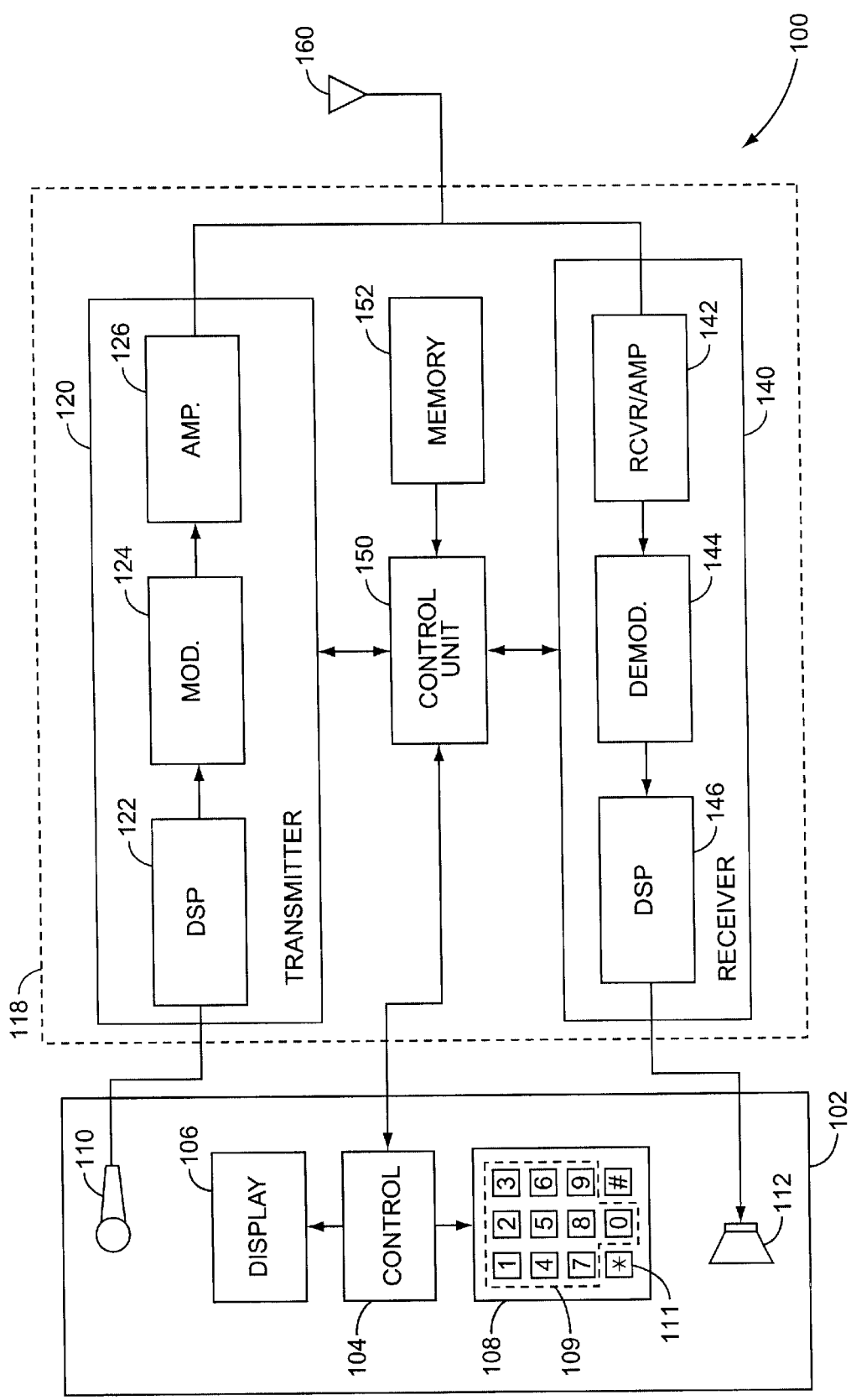
FIG. 2 is a block diagram of a typical cellular phone with SMS capability.

FIG. 2 illustrates in block diagram form the basic elements of the mobile station 100 with SMS capability. The mobile station 100 shown in FIG. 2 is a fully functional radio transceiver capable of transmitting and receiving digital signals. Those skilled in the art will recognize, however, that the present invention may be implemented in an analog transceiver. The mobile station 100 includes an operator interface 102, a transceiver section 118, and an antenna assembly 160.

The operator interface 102 includes a control unit 104, display 106, keypad 108, microphone 110, and speaker 112. The display 106 allows the operator to see dialed digits, stored information, and call status information. The keypad 108 allows the operator to dial numbers, enter commands, and select options. The control unit 104 interfaces the display 106 and keypad 108 with the main control unit 150. The microphone 110 receives audio signals from the user and converts the audio signals to analog signals. Speaker 112 converts analog signals from the transceiver section to audio signals that can be heard by the user.

The transceiver section 118 includes a transmitter 120, a receiver 140, and a main control unit 150. The analog signals from the microphone 110 are applied to the transmitter 120. The transmitter 120 includes a digital signal processor (DSP) 122, a modulator 124, and RF amplifier 126. The digital signal processor 122 converts the analog signals from the microphone 110 into a digital signal and compresses the digital signal. The DSP 122 also inserts error detection, error correction and signaling information. The compressed and encoded signal from the digital signal processor 122 is passed to the modulator 124. The modulator 124 converts the signal to a form that is suitable for transmission on a RF carrier. The signal then passes to the antenna assembly 160 for transmission via the RF amplifier 126.

The receiver 140 includes a receiver/amplifier 142, demodulator 144, and a digital signal processor 146. The receiver/amplifier 142 contains a band-pass filter to eliminate unwanted signals, a low level amplifier, and a RF mixer to convert the received signal to a lower frequency that is amplified and passed to the demodulator 144. The demodulator 144 extracts the transmitted bit sequence from the received signal. The demodulator 144 passes the demodulated signal to the digital signal processor 146 which decodes the signal, corrects channel-induced distortion, and performs error detection and correction. The digital signal processor 146 also separates control and signaling data from speech data. Control and signaling data is passed to the main control unit 150. Speech data is processed by a speech decoder and converted to an analog signal which is applied to the speaker 112 to generate audible signals which can be heard by the user.

The main control unit 150, such as a programmed microprocessor, functions to coordinate the operation of the transmitter 120 and the receiver 140. Memory 152 stores the program instructions and data needed by the control unit 150 to control the mobile station 100. The functions performed by the control unit 150 include power control, channel selection, timing, as well as a host of other functions known in the art. The control unit 150 inserts signaling messages into the transmitted signals and extracts signaling messages from the received signals. The control unit 150 responds to any base station commands contained in the signaling messages, and implements those commands. When the user enters commands via the keypad 108, the commands are transferred to the control unit 150 for action.

The mobile station 100 is used to send and receive speech and data signals in a conventional manner using known standards such as GSM or ANSI-136. The mobile station 100 also allows the user to input and send text messages using the Short Message Service (SMS).

Figure 3:
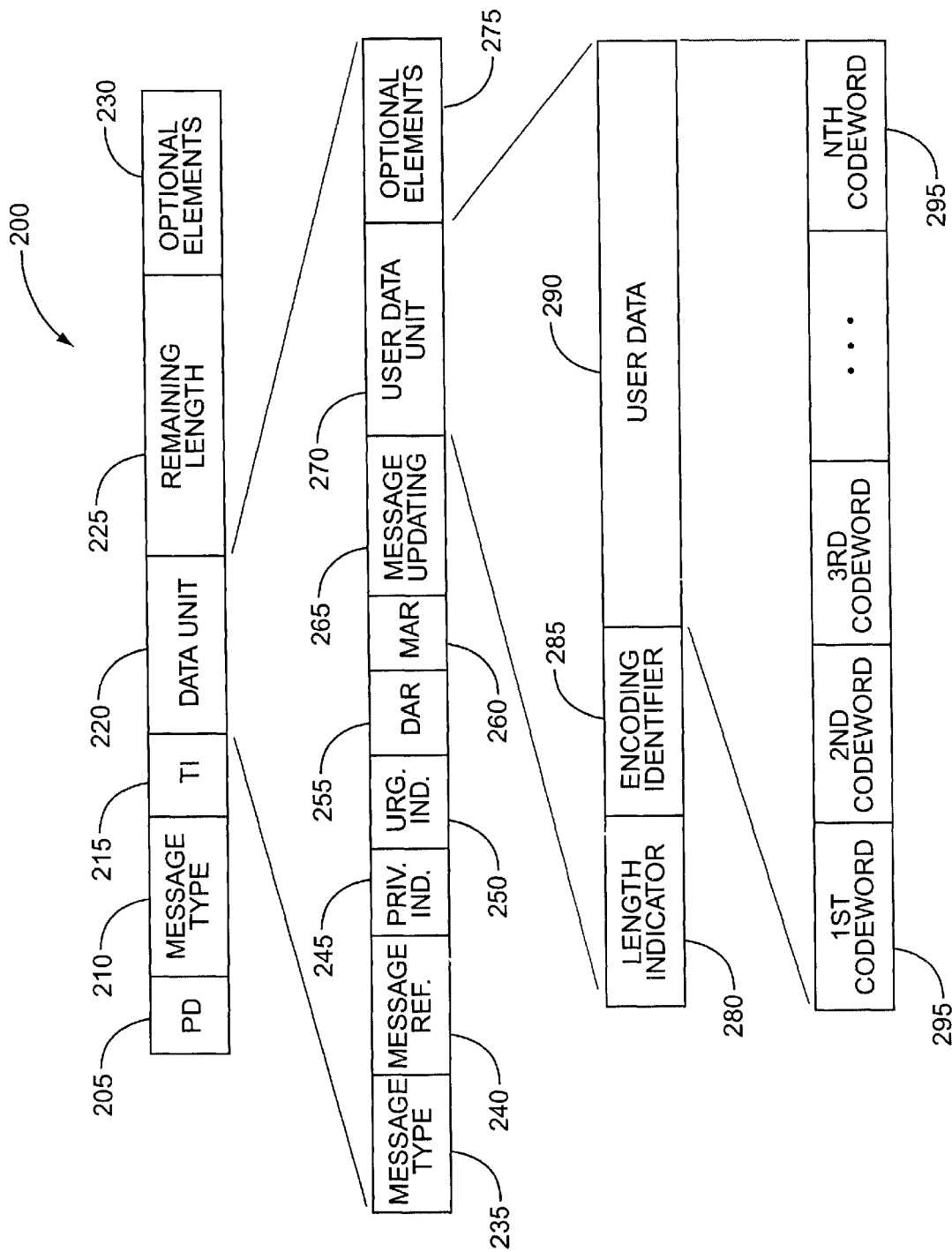
FIG. 3 is a schematic diagram illustrating the message structure for an SMS message used in the present invention.

FIG. 3 shows one message format for a layer 3 message, indicated generally at 200, that may be used to transport teleservice data including SMS data. The layer 3 message 200 includes one or more information elements (IEs). The layer 3 message includes mandatory information elements and optional information elements. The mandatory information elements include the Protocol Discriminator Information Element 205, Message Type Information Element 210, Transaction Identifier Information Element 215, Data Unit Information Element 220, and Remaining Length Information Element 225. The number and type of optional information elements 230 depend on the value of the Message Type Information Element 210 which identifies the function of the message being sent. The Protocol Discriminator Information Element 205 defines the protocol used for the message. The Transaction Identifier 215 is used to identify the particular transaction to which the message belongs so that multiple transactions can be handled simultaneously. The Data Unit Information Element 220 is used to carry the higher layer SMS protocol data unit.

A layer 3 message carrying SMS data is referred to herein as an SMS message. There are two types of SMS messages: an SMS Submit message and an SMS Deliver message. An SMS Submit is used to send SMS data from a mobile station to the base station. An SMS Deliver message is used to send SMS data from the base station to the mobile station.

The SMS protocol Data Unit 220 includes a Message Type Information Element 235, Message Reference Information Element 240, Privacy Indicator 245, Urgency Indicator 250, Delivery Acknowledgment Request Information Element 255, Manual Acknowledgment Request Information Request 260, Message Updating Information Element 265, User Data Unit Information Element 270, and optional elements 275. The User Data Unit Information Element 270 contains the text of the SMS message. The function of the remaining information elements 235–265 are not pertinent to the present invention. However, those interested in the function of these elements can refer to ANSI-136.

The User Data Unit Information Element 270 has a number of fields including the Length Indicator Field 280, Encoding Identifier Field 285, and a User Data Field 290. The Length Indicator Field 280 specifies the length in octets of the entire User Data Unit 270. The Encoding Identifier Field 285 indicates the encoding used in the User Data Field 290. The User Data Field 290 carries the user text message. In the present invention, each word or character, as the case may be, is represented by an eight bit codeword 295. Therefore, a text message having 12 words and characters will require 96 bits. The first eight bits of the User Data Field 290 represent the first word or character, the next eight bits represent the second word or character, and so forth until the final word or character is reached. At the receiving end, the eight bit codewords are extracted from the SMS message and translated into back into the original text message.

The particular choice and arrangement of information elements described in the context of FIG. 3 illustrates one possible embodiment and is not intended to be limiting. Those skilled in the art will realize that the invention can be carried out with other choices and arrangements of the same or similar information elements.

Conventionally, text messages are input by pressing keys on the keypad 108 to select characters one at a time to build the entire text message using the phone's default character set. The text message is transmitted as an SMS message. In general, the length of the message is limited to 140 bytes of data. When using the standard ASCII character set, a message of up to 160 characters can be sent, since each ASCII character requires only 7 bits per character. The bits representing the text message are stored in memory 152 and assembled into an SMS message as described above. At the receiving end, the characters are extracted from the transmitted bits one at a time and the resulting message is either output to the display 106 or stored in memory 152. To properly translate the message, the receiving station must use the same character set as the transmitting station.

The present invention departs from the conventional practice of entering characters one at a time to build a text message. Instead, the present invention allows word or phrases to be selected from a built-in library. Also, the present invention makes use of an enhanced character set to enable messages longer than 160 characters to be sent. While the SMS message is still limited to 140 bytes of data, the 8-bit codewords can represent not only individual alphanumeric characters or symbols, but also entire words and phrases. For example, suppose an SMS message includes the word DINNER. Using the conventional ASCII character set would require 48 bits (6 bytes) of data. If the trailing space is counted, then 56 bits (7 bytes) would be required. Using the present invention only 8 bits (1 byte) are required. Therefore, text messages with more than 160 alphanumeric characters can be transmitted.

Table 1, shown in FIG. 5, shows one exemplary character set that can be implemented using the present invention. Note that the character set includes both individual alphanumeric characters as well as whole words. Since each codeword has eight bits, up to 256 characters and words can be defined. In the disclosed example, the word DINNER is represented by the 8-bit codeword "00111010". When this codeword is received at the receiving station, it is translated into the word DINNER.

To facilitate rapid entry of text messages, the words and characters in the predefined character set are divided into groups. In the typical embodiment, the individual alphanumeric characters and symbols are divided into character groups and the words are divided into word groups. The character groups and word groups are then assigned to designated numeric keys 109 on the phone's keypad 108. Preferably, the key assignments should be made in a manner that is easily remembered by the user. By convention, standard telephones have letters associated with the numeric keys. For example, the letters DEF are associated with the 3-key of numeric keys 109 on a standard keypad 108. The present invention associates words beginning with DEF with the 3-key. Individual characters can be assigned in a similar manner as shown in Table 2.

TABLE 2

| KEY ASSIGNMENTS FOR CHARACTER GROUPS | |
|---|---|
| Key | Character |
| 1 | space-?!,.:"'()_1 |
| 2 | A B C Å Ä Æ á Ç 2 Γ |
| 3 | D E F è É 3 Δ Ψ |
| 4 | G H I i 4 |
| 5 | J K L 5 Λ |
| 6 | M N O Ñ Ö Ø Ó 6 |
| 7 | P Q R S β 7 Π Σ |

TABLE 2-continued

KEY ASSIGNMENTS FOR CHARACTER GROUPS

| Key | Character |
|---|---|
| 8 | T U V ü ú 8 |
| 9 | W X Y Z 9 |
| 0 | 0 + & @/$ % £ Θ Ξ ψ Ω |
| * | change case |
| # | #* |

For example, the characters associated with the 3-key include the number 3, the letter D, and the delta symbol (Δ).

To enter a text message, the user selects an entry mode. In the typical embodiment, two entry modes are available: character entry mode and word entry mode. In character entry mode, individual alphanumeric characters or symbols are entered one at a time by pressing numeric keys 109 on the keypad 108 as hereinafter described. In word entry mode, entire words are entered with trailing spaces. The user can selectively switch between word mode and character mode. Word mode is useful to speed entry of text messages. However, the vocabulary of available words is somewhat limited. Therefore, character mode allows you to enter individual characters to build words not in the character set. The user switches between word mode and character mode by pressing a designated mode key 111, such as the star (*) key.

In either character mode or word mode, words and characters are selected by first selecting a word group or character group and then scrolling through the selected group to the desired word or character. The character group or word group is selected by pressing the group key associated with the word group or character group. For example, if the user is in word mode, the user presses the 3-key to select the word group consisting of words beginning with the letters DEF. The user then scrolls through the available words in the DEF word group. In the disclosed embodiment, the user scrolls through the word group by repeatedly pressing the 3-key. The words are arranged alphabetically and each press of the 3-key advances to the next word. Alternatively, the user could scroll through the word group by using up and down arrow keys. One advantage of the latter method is that the user can scroll in either direction through the word group. Preferably, the word group wraps upon itself so that when the user reaches the last word in the group, the next press of the key returns the user to the first word and vice versa. When the desired word is reached, the word is entered by pressing a designated key, such as the enter key. When the entire message is complete, the user presses the send key.

Figure 4:
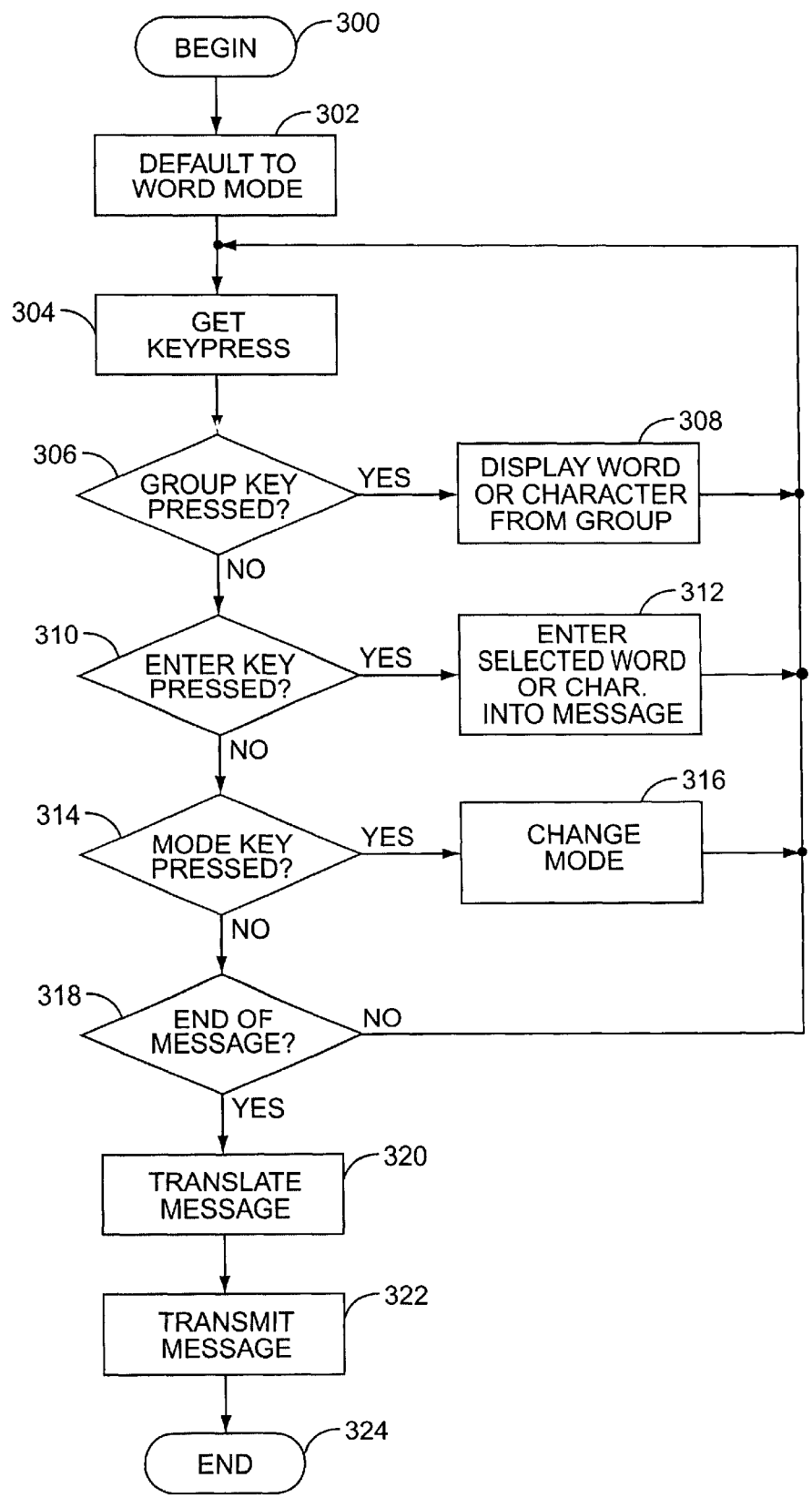
FIG. 4 is a flow diagram illustrating the text entry method of the present invention.

FIG. 4 shows a flow diagram illustrating the procedure for entering a text message. The user enters text entry mode by selecting a text entry option from a menu (block 300). The phone defaults to word entry mode (block 302). The phone captures each key press (block 304) and evaluates the key press (blocks 306, 310, 314 and 318). Initially, the phone 100 determines whether a group key is pressed (block 306) A group key is a key to which a word group or character group has been assigned. In the preferred embodiment, the numeric keys on the keypad 108 are group keys. If a group key is pressed, the phone displays a word or character from the corresponding word group or character group. The first time a group key is pressed, the phone displays the first word or character from the corresponding word group or character group. Each subsequent time the group key is consecutively pressed, the phone scrolls to the next word or character in the corresponding word group or character group. The phone then waits for the next key press. If two different group keys are pressed in sequence, the phone enters the current word or character from the first group and then displays the first word or character from the second group. The current word or character can also be entered by pressing the ENTER key (block 308). When the ENTER key is pressed, the phone enters the current word or character into the text message. During text entry mode, the user can switch between entry mode by pressing the star (*) key. When the star key is pressed (block 314), the phone enters the current word or character in the active group and then changes to either word mode or character mode as the case may be (block 316). When the end of message key is pressed (block 318), the phone translates each word or character entered by the user into an 8-bit codeword (block 320) and then transmits the message (block 322). After transmitting the message, the procedure ends (block 324).

FIG. 4 shows a flow diagram illustrating the procedure for entering a text message. The user enters text entry mode by selecting a text entry option from a menu (block 300). The phone defaults to word entry mode (block 302). The phone captures each key press (block 304) and evaluates the key press (blocks 306, 310, 314 and 318). Initially, the phone 100 determines whether a group key is pressed (block 306). A group key is a key to which a word group or character group has been assigned. In the preferred embodiment, the numeric keys 109 on the keypad 108 are group keys. If a group key is pressed, the phone displays a word or character from the corresponding word group or character group. The first time a group key is pressed, the phone displays the first word or character from the corresponding word group or character group. Each subsequent time the group key is consecutively pressed, the phone scrolls to the next word or character in the corresponding word group or character group. The phone then waits for the next key press. If two different group keys are pressed in sequence, the phone enters the current word or character from the first group and then displays the first word or character from the second group. The current word or character can also be entered by pressing the ENTER key (block 308). When the ENTER key is pressed, the phone enters the current word or character into the text message. During text entry mode, the user can switch between entry mode by pressing the star (*) key. When the star key is pressed (block 314), the phone enters the current word or character in the active group and then changes to either word mode or character mode as the case may be (block 316). When the end of message key is pressed (block 318), the phone translates each word or character entered by the user into an 8-bit codeword (block 320) and then transmits the message (block 322). After transmitting the message, the procedure ends (block 324).

It may also be desirable to designate certain keys for editing functions. For example, the arrow keys on a phone could be used to move the cursor to a desired position to write over a word or character that was previously entered. An escape or cancel key could be used to cancel the last key press. This could be useful, for example, if the user accidentally selects the wrong word group or character group. The user could correct this mistake by pressing the escape or cancel key and then the correct group key for the desired word group or character group. A backspace key could be used to delete the last word or character that was entered. These are only a few examples of editing operations that can be accommodated.

Since each word or character is represented by an 8-bit codeword, the available character set is limited to 256 characters and/or words. It is possible to extend the built-in vocabulary by using two or more character sets, each of which comprises 256 characters or words. When a single character set is used, each byte of data in the user data field 290 of an SMS message represents a single word or character. Thus, a text message generated according to the present invention may have a total of 140 individual characters or words. As an alternative, each character or word could be represented by a 10-bit codeword. The first two bits could be used to designate a character set. The final 8 bits would be used to designate the particular character in the designated character set. By using 2 bits to designate a character set, up to four character sets could be implemented, permitting a vocabulary of 1,024 words. A 1,024 word vocabulary would be sufficient to encompass the majority of words used in daily speech. However, using 10 bits for each word or character would limit text messages to a total of 112 words or characters.

Other protocols for implementing multiple character sets can be used. In another embodiment, 2 bits are used to designate a character set. The next 2 bits are used to specify the number of characters or words that use the designated character set. Since the word number field is only 2 bits, it would specify a number N between 1 and 4. The next N bytes would contain the codewords for the designated number of words or characters. In this embodiment, words and characters would be assigned to character sets based on the probability of those words or characters occurring in sequence to increase the probability of consecutive words being in the same character set. If, on average, two consecutive words are selected from the same character set, then 20 bits would be used for every two words or characters. This equates to a total of 112 individual words or characters.

The present invention facilitates the entry of lengthy text messages into a mobile phone having a limited number of keys. This method is much faster than the multi-tap approach used in conventional phones. Further, the method of the present invention allows longer text messages to be sent by including entire words and phrases in the character set. That is, the present invention treats words and phrases like a single character. Thus, an entire word or phrase can be sent using only 8 bits of data whereas conventional phones require 8 bits of data for each letter in a word.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of transmitting text messages from a cellular phone comprising:
   storing a plurality of word groups in a memory of the cellular phone, each word group comprising one or more word entries;
   associating respective ones of the word groups with respective ones of the numeric input keys comprising a phone keypad of the cellular phone;
   displaying a corresponding one of the word groups on a display of the cellular phone responsive to a user actuating a numeric key;
   scrolling through the word entries comprising the displayed word group responsive to subsequent actuations of the same key to allow selection of desired word entries; and
   accumulating selected word entries to form a text message for transmission from the cellular telephone.

2. The method of claim 1, further comprising defining alphabetic letter associations for one or more of the numeric keys, and wherein associating respective ones of the word groups with respective ones of the numeric input keys comprises associating the word groups with the numeric keys based on matching the word groups to the alphabetic associations of the numeric keys.

3. The method of claim 2, wherein defining alphabetic letter associations for one or more of the numeric keys comprises adopting telephone dial pad alphabetic associations.

4. The method of claim 1, further comprising operating the cellular phone in a first mode wherein the numeric keys provide numeric input for dialing, and operating the cellular phone in a second mode wherein the numeric keys provide word group and word entry selection input for text messaging.

5. The method of claim 1, further comprising:
   storing a character set in the memory;
   associating respective characters comprising the character set with respective ones of the numeric keys; and
   defining a character entry mode and a word entry mode such that actuation of the numeric keys in character entry mode enters characters for text messaging and actuation of the numeric keys in word entry mode enters words for text messaging.

6. The method of claim 5, further comprising defining one of the keys of the phone keypad as a mode selection key such that a user of the cellular phone can switch between character and word modes.

7. The method of claim 1, wherein displaying a corresponding one of the word groups on a display of the cellular phone responsive to a user actuating a numeric key comprises displaying a list of one or more word entries in the corresponding word group on the display responsive to user actuation of the numeric key.

8. The method of claim 7, wherein scrolling through the word entries comprising the displayed word group responsive to subsequent key actuations to allow selection of desired word entries comprises scrolling the list responsive to successive actuation of the numeric key.

9. The method of claim 8, wherein pressing another numeric key selects one of the word entries in the list.

10. The method of claim 8, wherein pressing an enter key included in the phone keypad selects one of the word entries in the list.

11. A cellular phone comprising:
   a transceiver for making cellular telephone calls and transmitting text messages;
   a memory for storing a plurality of word groups, each word group comprising one or more word entries;
   a keypad comprising a plurality of keys, including numeric keys for dialing number entry;
   a display; and
   control logic for associating respective ones of the word groups with respective ones of the numeric keys, the control logic operative to:
      display a list of one or more word entries from a corresponding word group on the display responsive to a user actuating one of the numeric keys;
      scroll the list responsive to subsequent actuations of the same key to allow selection of desired word entries; and
      accumulate selected word entries to form a text message for transmission by the transceiver.

12. The cellular phone of claim 11, wherein the keypad further includes an entry key for selecting one of the word entries displayed in the list.

13. The cellular phone of claim 11, wherein the control logic is further operative to select one of the word entries displayed in the list responsive to the user actuating another one of the numeric keys.

14. The cellular phone of claim 11, wherein one or more of the numeric keys have alphabetic associations, and wherein the control logic associates respective ones of the word groups to respective ones of the numeric keys based on the alphabetic associations.

15. The cellular phone of claim 11, wherein the memory further stores at least one character set, and wherein the control logic associates respective characters comprising the character set with respective ones of the numeric keys.

16. The cellular phone of claim 15, wherein the control logic is operative in a character entry mode and a word entry mode, such that actuation of the numeric keys in the character entry mode enters characters for text messaging and actuation of the numeric keys in the word entry mode enters words for text messaging.

17. The cellular phone of claim 16, wherein the keypad further includes a mode selection key for switching between word and character entry modes.

* * * * *